(12) United States Patent
Appelman et al.

(10) Patent No.: US 7,541,093 B2
(45) Date of Patent: Jun. 2, 2009

(54) COATING COMPOSITION

(75) Inventors: Eric Appelman, Dordrecht (NL); Wilhelmus Jacobus Adrianus Honcoop, Bergambacht (NL)

(73) Assignee: Unichema Chemie B.V., Gouda (NL)

( * ) Notice: Subject to any disclaimer, the term of this patent is extended or adjusted under 35 U.S.C. 154(b) by 404 days.

(21) Appl. No.: 10/499,702

(22) PCT Filed: Dec. 19, 2002

(86) PCT No.: PCT/EP02/14561

§ 371 (c)(1), (2), (4) Date: Nov. 8, 2004

(87) PCT Pub. No.: WO03/054092

PCT Pub. Date: Jul. 3, 2003

(65) Prior Publication Data

US 2005/0072332 A1    Apr. 7, 2005

(30) Foreign Application Priority Data

Dec. 21, 2001    (GB)    ................................ 0130659.6

(51) Int. Cl.
*B32B 15/092* (2006.01)
*B32B 13/12* (2006.01)
*B32B 27/26* (2006.01)
*B32B 27/38* (2006.01)
*C08L 63/00* (2006.01)
*C08L 79/00* (2006.01)

(52) U.S. Cl. ........................ 428/416; 428/413; 428/414; 428/418; 523/400; 525/523

(58) Field of Classification Search ........................ None
See application file for complete search history.

(56) References Cited

U.S. PATENT DOCUMENTS

| 4,973,743 A | 11/1990 | Turner et al. |
| 5,478,912 A | 12/1995 | Kimura et al. |
| 5,874,625 A * | 2/1999 | Elsasser ...................... 564/490 |

FOREIGN PATENT DOCUMENTS

| GB | 878132 | 9/1961 |
| GB | 949717 | 2/1964 |
| JP | 07-145238 | 6/1995 |
| JP | 11-315250 | 11/1999 |

* cited by examiner

*Primary Examiner*—Michael J Feely
(74) *Attorney, Agent, or Firm*—Jones Day

(57) ABSTRACT

A coating composition containing an epoxy resin and a curing agent comprising a trimer fatty triamine and/or higher oligomeric amine. The coating composition is particularly suitable for use as a primer coating layer on concrete and steel.

35 Claims, No Drawings

COATING COMPOSITION

CROSS REFERENCE TO RELATED APPLICATION

This application is the National Phase application of International Application No. PCT/EP02/14561, filed Dec. 19, 2002, which designates the United States and was published in English. This application, in its entirety, is incorporated herein by reference.

FIELD OF INVENTION

The present invention relates to an epoxy resin coating composition, and in particular to such a composition comprising a curing agent comprising a trimer fatty triamine and/or higher oligomeric amine.

BACKGROUND

Coatings based on epoxy resins are important industrial products. The largest volume of these products is used for the protection and decoration of large metal or concrete structures such as bridges, ships, industrial tanks, etc., where application of the coating must be performed under ambient conditions. Epoxy resin coatings provide a combination of corrosion resistance, water resistance, abrasion resistance and solvent resistance.

Most epoxy resin coatings designed for ambient application employ polyfunctional amines as the curing agent, either alone or in some cases in combination with other curing agents. Several classes of amine curing agents are used commercially, including low molecular weight diamines such as metaxylene diamine, isophorone diamine, polyether diamines, and polyamides (usually the reaction products of dimer fatty acids (such as PRIPOL 1017 and PRIPOL 1048 (trade marks, ex Uniqema)) and polyamines). They are described in W. R. Ashcroft, Curing Agents for Epoxy Resins, in B. Ellis (ed.), Chemistry and Technology of Epoxy Resins, Blackie Academic and Professional, London, 1993, pp. 37-71.

However, there are a number of problems associated with existing epoxy resin curing agents. Low molecular weight diamines for example are often volatile and sometimes toxic, and may result in an epoxy resin having insufficient flexibility.

Polyamides, on the other hand, can have relatively low reactivity, particularly at temperatures close to zero, and also generally have high viscosity which means that they must be used with organic solvents. For both environment and safety reasons there is a general requirement to reduce solvent levels in coatings, including epoxy coatings. Thus, there is a need for improved low viscosity curing agents for epoxy resins.

Restrictions on the use of solvents may require that low molecular weight epoxy resins be used in place of the preferred, higher molecular weight epoxy resins irrespective of the viscosity of the curing agent employed. The use of low molecular weight epoxy resins increases the drying time of the coating. Thus, there is a need for curing agents that reduce the drying time of epoxy coatings, particularly those based on liquid epoxy resins.

For good protection of substrates, such as concrete and metal, it is necessary that the coating maintain good adhesion to the substrate, particularly under wet conditions. While epoxy coatings generally have good adhesion, there is still a need for improved adhesion, particularly on substrates such as cold-rolled steel (CRS).

Finally, there is a need for curing agents that can lead to epoxy coating compositions with greater corrosion resistance, leading to coatings with longer life in service.

SUMMARY OF THE INVENTION

We have now surprisingly discovered an epoxy resin coating composition which reduces or substantially overcomes at least one of the aforementioned problems.

Accordingly, the present invention provides a coating composition comprising an epoxy resin and a curing agent comprising at least one trimer fatty triamine and/or higher oligomeric amine.

The invention also provides an epoxy resin cured with a trimer fatty triamine and/or higher oligomeric amine.

The invention further provides the use of a trimer fatty triamine and/or higher oligomeric amine to cure an epoxy resin.

The invention further provides a concrete substrate coated with (i) a primer layer formed from a coating composition comprising an epoxy resin and a curing agent comprising at least one trimer fatty triamine and/or higher oligomeric amine, and (ii) an additional epoxy resin coating layer, different from the primer layer, optionally comprising filler.

The invention further provides a steel substrate coated with (i) a primer layer formed from a coating composition comprising an epoxy resin and a curing agent comprising at least one trimer fatty triamine and/or higher oligomeric amine, and (ii) an additional alkyd resin or polyurethane resin coating layer.

The invention still further provides a method of making a coating composition comprising (i) polymerising fatty acids under pressure to produce a reaction mixture comprising mono fatty acid and/or dimer fatty acid and/or trimer fatty acid, (ii) converting at least one of the acids in the reaction mixture produced in (i) to an amine, and (iii) mixing at least one of the amines produced in (ii) with an epoxy resin, with the proviso that at least one of the amines is a trimer fatty triamine or a higher oligomeric amine.

The epoxy resin is a polyepoxy compound containing more than one 1,2-epoxy groups per molecule. Such epoxides are well known in the epoxy coating art and are described in Y. Tanaka, "Synthesis and Characteristics of Epoxides", in C. A. May, ed., Epoxy Resins Chemistry and Technology (Marcel Dekker, 1988). Examples include those epoxides disclosed in U.S. Pat. No. 5,599,855 column 5, line 6 to column 6, line 20. The preferred polyepoxy compounds are the diglycidyl ethers of bisphenol-A, the advanced diglycidyl ethers of bisphenol-A, the diglycidyl ethers of bisphenol-F, and the epoxy novolac resins.

Epoxy resins are available in a range of viscosities. The most commonly employed epoxy resins are those based upon the diglycidyl ether of bisphenol-A (DGEBA), and higher molecular weight oligomers prepared by the advancement of DGEBA with additional bisphenol-A. Epoxy resins are generally difunctional or slightly less than difunctional, and can be characterized by their epoxy equivalent weight (EEW). Thus bisphenol-A derived epoxy resin with an EEW of 180 g has viscosity of about 8500 mPa.s. Slightly increasing the EEW to 190 g increases the viscosity to about 12,000 mPa.s. At an EEW of about 300 g, epoxy resins partially crystallize at a fairly rapid rate to a semi-solid, and above an EEW of about 400 g they are solids, and thus their viscosities cannot be measured at room temperature.

In the formulation of coatings, it is frequently advantageous to employ higher molecular weight epoxy resins, such as those with an EEW of 450 to 500 g (known in the industry as '1 type' resins). High molecular weight resins dramatically decrease the drying time of the coating. Furthermore, higher molecular weight epoxy resins yield more flexible and impact resistant coatings than do lower molecular weight epoxy resins. Unfortunately, the high viscosity of the higher molecular weight epoxy resins requires the use of high levels of solvent in order to achieve a suitable application viscosity.

To reduce the viscosity of a given composition, the epoxy resin may be modified with a portion of monofunctional epoxide. This reduction in viscosity may, for example, enable the level of pigment in a formulation to be increased whilst still allowing easy application, or to allow the use of a higher molecular weight epoxy resin. Examples of useful monoepoxides include styrene oxide, cyclohexene oxide, ethylene oxide, propylene oxide, butylene oxide, and the glycidyl ethers of phenol, the cresols, tert-butylphenol and other alkyl phenols, butanol, 2-ethylhexanol, and C8 to C14 alcohols.

The epoxy resins used in the present invention preferably have an EEW in the range from 160 to 4000 g, more preferably 170 to 900 g, particularly 180 to 700 g, and especially 184 to 500 g.

For coating onto steel, the epoxy resins preferably have an EEW in the range from 450 to 550 g, more preferably 470 to 530 g, particularly 490 to 510 g, and especially about 500 g. For coating onto concrete, the epoxy resins preferably have an EEW in the range from 180 to 250 g, more preferably 184 to 200 g, particularly 188 to 195 g, and especially about 190 g.

The trimer fatty triamine curing agent used in the present invention is preferably formed from the corresponding trimer fatty acid.

The terms trimer fatty acid and dimer fatty acid are well known in the art, and refer to the trimerisation/dimerisation products of mono- or polyunsaturated fatty acids and/or esters thereof. They are described T. E. Breuer, 'Dimer Acids', in J. I. Kroschwitz (ed.), Kirk-Othmer Encyclopedia of Chemical Technology, 4th Ed., Wiley, New York, 1993, Vol. 8, pp. 223-237. They are prepared by polymerizing fatty acids under pressure, and then removing most of the unreacted fatty acid starting materials by distillation. The final product usually contains some mono fatty acid, mostly dimer fatty acids, and trimer fatty acids and some higher or oligomeric fatty adds. The resultant product can be prepared with various levels of the different fatty acids. The ratio of dimer fatty acids to trimer fatty acids can be varied, by modifying the processing conditions and/or the unsaturated acid feedstock. The trimer fatty acid may be isolated in substantially pure form from the product mixture, using purification techniques known in the art, or alternatively a mixture of trimer fatty acid and dimer fatty acid may be employed to produce the corresponding amines. The trimer fatty triamine and optional dimer fatty diamine may be produced from the corresponding trimer fatty acid and optional dimer fatty acid by standard chemical methods known in the art, for example by reacting with ammonia followed by hydrogenation, as described in EP-530696-A.

The curing agent used in the present invention preferably has a trimer fatty triamine (or trimer) content of greater than 5%, more preferably in the range from 10 to 90%, particularly 30 to 70%, and especially 40 to 50% by weight. In addition, particularly preferred curing agents have a dimer fatty diamine (or dimer) content of less than 95%, more preferably in the range from 10 to 90%, particularly 30 to 70%, and especially 50 to 60% by weight. Further, the curing agent preferably comprises less than 10%, more preferably in the range from 1 to 6%, particularly 2 to 4%, and especially 2.5 to 3.5% by weight of mono fatty monoamine (or monomer). All of the above % by weight values are based on the total weight of trimer, dimer and monomer amine present in the curing agent.

Preferred trimer fatty triamines are trimers of $C_{10}$ to $C_{30}$, more preferably $C_{12}$ to $C_{24}$, particularly $C_{14}$ to $C_{22}$, and especially $C_{18}$ alkyl chains. Thus, preferred trimer fatty triamines contain in the range from 30 to 90, more preferably 36 to 72, particularly 42 to 66, and especially 54 carbon atoms. The molecular weight (weight average) of the trimer fatty triamine is preferably in the range from 750 to 950, more preferably 790 to 910, particularly 810 to 890, and especially 830 to 870.

Suitable trimer fatty triamines are preferably derived from (ie are amine equivalents of) the trimerisation products of oleic acid, linoleic acid, linolenic acid, palmitoleic acid, and elaidic acid, and particularly of oleic acid. The trimer fatty triamines may also be derived from the trimerisation products of the unsaturated fatty acid mixtures obtained in the hydrolysis of natural fats and oils, e.g. of sunflower oil, soybean oil, olive oil, rapeseed oil, cottonseed oil and tall oil. Hydrogenated, for example by using a nickel catalyst, trimer fatty acids may also be employed to produce the corresponding trimer fatty triamines.

Similarly, the optional dimer fatty diamines are preferably derived from the dimerisation products of the materials mentioned in the above paragraph, and are preferably dimers of $C_{10}$ to $C_{30}$, more preferably $C_{12}$ to $C_{24}$, particularly $C_{14}$ to $C_{22}$, and especially $C_{18}$ alkyl chains. Thus, the dimer fatty diamines preferably contain in the range from 20 to 60, more preferably 24 to 48, particularly 28 to 44, and especially 36 carbon atoms. The molecular weight (weight average) of the dimer fatty diamine is preferably in the range from 450 to 690, more preferably 500 to 640, particularly 530 to 610, and especially 550 to 590.

In one embodiment of the present invention, tetramer fatty tetraamines and higher oligomers (hereinafter both referred to as oligomeric amines) are formed during production of the amine from the trimer fatty acid and/or dimer fatty acid and/or mono fatty acid. Such oligomeric amines can also be used as a curing agent for epoxy retins according to the present invention, either alone (by isolating from the amine reaction product mixture) or in combination with trimer fatty triamines and/or dimer fatty diamines and/or mono fatty monoamines. The oligomeric amines are preferably oligomers, containing 4 or more units, of $C_{10}$ to $C_{30}$, more preferably $C_{12}$ to $C_{24}$, particularly $C_{14}$ to $C_{22}$, and especially $C_{18}$ alkyl chains. The molecular weight (weight average) of the oligomeric amine is suitably greater than 1,000, preferably in the range from 1,200 to 1,800, more preferably 1,300 to 1,700, particularly 1,400 to 1,600, and especially 1,400 to 1,550.

The curing agent suitably comprises up to 100%, preferably in the range from 1 to 50%, more preferably 5 to 35%, particularly 10 to 25%, and especially 14 to 20% by weight of oligomeric amines. When the oligomeric amine is present together with trimer fatty triamine and/or dimer fatty diamine, (i) the amount of trimer fatty triamine is preferably in the range from 5 to 70%, more preferably 15 to 55%, particularly 20 to 45%, and especially 25 to 35% by weight, and/or (ii) the amount of dimer fatty diamine is preferably in the range from 10 to 90%, more preferably 25 to 80%, particularly 40 to 70%, and especially 50 to 60% by weight. All of the above % by weight values are based on the total weight of oligomer, trimer and dimer amine present in the curing agent.

The curing agent used in the present invention is normally formulated with epoxy resins at stoichiometeric ratios of amine hydrogen to epoxy groups, suitably in the molar ratio range from 0.25 to 4:1, preferably 0.5 to 2:1, more preferably 0.8 to 1.2:1, particularly 0.9 to 1.1:1, and especially about 1:1.

The compatibility of the epoxy resin coating composition may be improved by reacting a proportion of the curing agent with monofunctional epoxy resins or difunctional epoxy resins (having excess of amine hydrogen), prior to mixing all of the reactants together. This is a common practice well known to those skilled in the art, and is generally referred to as adduction. Particularly useful epoxy resins for adduction include the diglycidyl ethers of bisphenol-A, the advanced diglycidyl ethers of bisphenol-A, the diglycidyl ethers of bisphenol-F, styrene oxide, cyclohexene oxide, and the glycidyl ethers of phenol and other alkyl phenols.

An advantage of a coating composition according to the present invention is that relatively low viscosities can be achieved at relatively high solids content (combined amount of epoxy resin and curing agent), ie at low solvent content. Thus, a coating composition having a viscosity of 40 mPa.s at 23° C. can be achieved which has a solids content of greater than 35%, more preferably in the range from 40 to 70%, particularly 45 to 60%, and especially 50 to 55% by weight based on the total weight of the composition. Similarly, a coating composition having a viscosity of 40 mPa.s at 23° C. can be achieved which has a solvent content of less than 65%, more preferably in the range from 30 to 60%, particularly 40 to 55%, and especially 45 to 50% by weight based on the total weight of the composition. The coating composition suitably has a solids content value in % by weight based on the total weight of the composition of greater than the viscosity value in mPa.s at 23° C. of the coating composition, preferably by greater than 4, more preferably in the range from 8 to 30, particularly 10 to 20, and especially 12 to 16 units.

In use, a preferred coating composition according to the present invention has a viscosity in the range from 40 to 50 mPa.s at 23° C., and preferably has a solids content in the range from 35 to 70%, more preferably 45 to 65%, and particularly 50 to 60% by weight based on the total weight of the composition.

A particular advantage is that the above preferred ranges of solids and solvent content can be achieved for an epoxy resin having an EEW in the range from 450 to 500 g.

The above preferred solids and solvent ranges are relevant to coating compositions which contain little or no filler or pigment material, which are normally inorganic materials. Suitable fillers include chalk, and clay, and suitable pigments include carbon black, titanium dioxide and iron oxide. If the coating composition does contain significant amounts of fillers and/or pigments, for example 25 to 30% by weight in total based on the weight of the coating composition, then additional solvent will normally have to be added to achieve the desired viscosity.

In some circumstances it may be advantageous to incorporate so-called accelerators in coating compositions according to the present invention. Such accelerators are described in H. Lee and K. Neville, Handbook of Epoxy Resins, McGraw-Hill, New York, 1967. Suitable accelerators include various organic acids, alcohols, phenols, tertiary amines, hydroxylamines, and the like. Particularly useful accelerators include benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl)phenol, and tris(dimethylaminomethyl)phenol. Normally, such accelerators are used at levels of 10% or less based on the total weight of the epoxy resin, and more usually at levels of less than 5%.

Plasticizers may also be incorporated into coating compositions of the present invention. This is particularly useful in cases where, in the absence of such a plasticizer, the glass transition temperature, Tg, of the composition significantly exceeds the ambient temperature, before the degree of reaction necessary to meet certain requirements such as solvent and chemical resistance and tensile strength has been achieved. Such plasticizers are well known to those skilled in the, art, and are described in D. F. Cadogan and C. J. Howick, 'Plasticizers', in J. I. Kroschwitz, ed., Kirk-Othmer Encyclopedia of Chemical Technology, 4th Ed., Wiley, New York, 1996, Vol. 19, pp. 258-290. Particularly useful plasticizers include benzyl alcohol, nonylphenol, and various esters of phthalic acid. The ester plasticizers would normally be incorporated in the same package as the epoxy resin to minimize reaction with the curing agent.

Protective or decorative coatings prepared from a composition according to the present invention can be formulated with a wide variety of ingredients well known to those skilled in the art of coating formulation, including solvents, fillers, pigments, pigment dispersing agents, rheology modifiers, thixotropes, flow and leveling aids, defoamers, etc. Mixtures of solvents will frequently be chosen so as to give the best evaporation rate profile for the system whilst maintaining solubility of the binder components. Suitable solvents include aromatics, aliphatics, esters, ketones, ethers, alcohols, glycols, glycol ethers, and the like. Particularly useful in the formulation are ketones, such as acetone, methyl ethyl ketone, methyl isoamyl ketone, methyl propyl ketone, methyl amyl ketone, diacetone alcohol and the like, which can be used to improve pot life with little or no sacrifice in drying speed. If ester solvents are included in the formulation, it is usually necessary to formulate them in the package containing the epoxy resin, so as to minimize their reaction with the curing agent.

Coating compositions of the present invention can be applied by any number of techniques including spray, brush, roller, paint mitt, and the like. Numerous substrates are suitable for application of coatings of this invention with proper surface preparation, as is well understood in the art. Such substrates include, but are not limited to, many types of metal, particularly steel and aluminum, as well as concrete.

The coating compositions are particularly suitable for use as a primer coating on substrates such as concrete and steel. A preferred coating or overcoat layer to be used on top of a primer coating layer according to the present invention coated onto (i) concrete, is an epoxy coating layer, different from the primer layer, preferably comprising fillers, such as stone chips; and (ii) steel, is an alkyd resin and/or polyurethane resin coating layer.

Coatings of this invention can be applied and cured at ambient temperatures ranging from about 0 to about 50° C., with temperatures of 10 to 40° C. being preferred. If desired, these coatings can also be force cured at temperatures up to 100° C. or greater.

curing agent composition (derived from a 60/40% by weight dimer/trimer fatty acid mixture obtained from oleic acid feedstock) (Example C) comprising 29% by weight of trimer fatty triamine, 54% by weight of dimer fatty diamine, and 17% by weight of oligomeric amine (molecular weight (weight average) of 1,500 (determined by high temperature gas chromatography using an Agilent 6890, Ultimetal Simdist column (length 5 m, i.d 0.53 mm, Df=0.17 μm) at an oven temperature of 60° C. (hold 1 min), rate 1:30° C./min>150° C., rate 2:12° C./min>380° C. (hold 10 minutes))), and EPIKOTE 1001 (bisphenol-A type epoxy resin (ex, Resolution) having an EEW of 480 g (measured according to ASTM D 1652-67) were mixed together. The EPIKOTE 1001 was diluted with solvent (Component 1) prior to mixing with the curing agent. The viscosity of the mixture was reduced to 40-50 mPa.s, as measured at 23° C. on a Brookfield viscometer, by adding the required amount of a solvent blend of a 50/50 (v/v) n-butanol/xylene mixture.

| Component 1 | |
| --- | --- |
|  | Parts by weight |
| EPIKOTE 1001 (75% epoxy in xylene) | 100 |
| Xylene | 51 |
| Methyl isobutyl ketone (MIBK) | 37.5 |

| Example no. | Curing agent | Parts by Weight | Parts by Weight solvent | Formulated clear laquer Viscosity (mPa·s at 23° C.) | Solids (%) | Pot life (days) |
| --- | --- | --- | --- | --- | --- | --- |
| A (Comparative) | Versamide 115-type polyamide (70% in xylene) | 44 | 50 | 45 | 37 | 3 |
| B (Comparative) | Versamide 125-type polyamide | 54 | 37.5 | 50 | 46 | 3 |
| C | Trimer fatty triamine/ Oligomeric amine | 42 | — | 42 | 53 | >3 |

The invention is illustrated by the following non-limiting examples.

EXAMPLES

Stoichiometric amounts of commercially available polyamide curing agents (Comparative Examples A and B), and a The films were coated onto glass and metal by using a Meyer bar, dried overnight at 23° C., 50% relative humidity, and the following tests performed;
(i) hardness (according to ASTM D 4366),
(ii) gloss (according to ASTM D 523),
(iii) indirect impact (ASTM D 2794), and
(iv) drying time (using a drying recorder from Byk-Gardner).

| Example no. | | 150 μm wet on glass | | 150 μm wet on metal | |
| --- | --- | --- | --- | --- | --- |
| | | König hardness (s) | Gloss 20°/60° (gloss unit) | König hardness (s) | Impact (Indirect) (Kg·cm) |
| A (Comp) | Versamide 115-type polyamide (70% in xylene) | 89 | 123/124 | 96 | >200 |
| B (Comp) | Versamide 125-type polyamide | 74 | 78/100 | 145 | >200 |
| C | Trimer fatty triamine/ Oligomeric amine | 99 | 168/145 | 160 | >200 |

| Example no. | | Drying recorder 76 μm wet (hours) | | | | |
|---|---|---|---|---|---|---|
| | | Stage 0 | Stage 1 | Stage 2 | Stage 3 | Stage 4 |
| A (Comp) | Versamide 115-type polyamide (70% in xylene) | ½ | 3½-4 | 5-6 | 7-8 | >12 |
| B (Comp) | Versamide 125-type polyamide | ¾-1 | 4 | 6-7 | 8½-9 | >12 |
| C | Trimer fatty triamine/ Oligomeric amine | ½ | 1-2 | 2½-3 | 5 | 10-11 |

Stage 0: leveling,
Stage 1: basic trace,
Stage 2: film building,
Stage 3: Surface trace,
Stage 4: Dry The above examples illustrate the improved properties of a coating composition according to the present invention.

The invention claimed is:

1. A coating composition comprising an epoxy resin and a curing agent comprising:
   (i) 30 to 70% by weight of at least one trimer fatty triamine;
   (ii) 30 to 70% by weight of dimer fatty diamine; and
   (iii) less than 10% by weight of mono fatty monoamine,
   all based on the total weight of trimer, dimer and monomer fatty amines present in the curing agent.

2. A composition according to claim 1 wherein the epoxy resin has an epoxy equivalent weight in the range from 160 to 4000 g.

3. A composition according to claim 1 wherein the trimer fatty triamine is a trimer of $C_{10}$ to $C_{30}$ alkyl chains.

4. An epoxy resin cured with a curing agent, said curing agent comprising:
   (i) 30 to 70% by weight of a trimer fatty triamine;
   (ii) 30 to 70% by weight of a dimer fatty diamine; and
   (iii) less than 10% by weight of mono fatty monoamine,
   all based on the total weight of trimer, dimer, and monomer fatty amines present in the curing agent.

5. A method of curing an epoxy resin comprising mixing with the epoxy resin a curing agent comprising:
   (i) 30 to 70% by weight of a trimer fatty triamine;
   (ii) 30 to 70% by weight of dimer fatty diamine; and
   (iii) less than 10% by weight of mono fatty monoamine,
   all based on the total weight of trimer, dimer and monomer fatty amines present in the curing agent, to cure an epoxy resin.

6. A method of making a coating composition comprising
   (i) polymerising fatty acids under pressure to produce a reaction mixture comprising mono fatty acid and/or dimer fatty acid and/or trimer fatty acid,
   (ii) converting at least one of the acids in the reaction mixture produced in (i) to an amine, and
   (iii) mixing at least one of the amines produced in (ii) with an epoxy resin, with the proviso that at least one of the amines comprises:
      (i) 30 to 70% by weight of trimer fatty triamine;
      (ii) 30 to 70% by weight of dimer fatty diamine; and
      (iii) less than 1% by weight of mono fatty monoamine,
      all based on the total weight of trimer, dimer and monomer fatty amines present in the curing agent.

7. A coating composition, comprising an epoxy resin and a curing agent comprising:
   (a) 15 to 55% by weight of trimer fatty triamine;
   (b) 25 to 80% by weight of dimer fatty diamine; and
   (c) 5 to 35% by weight of at least one higher oligomeric fatty amine that features one amine group per fatty acid repeating unit,
   all based on the total weight of oligomer, trimer and dimer fatty amines present in the curing agent.

8. A composition according to claim 7 wherein the epoxy resin has an epoxy equivalent weight in the range from 160 to 4000 g.

9. A composition according to claim 7 wherein the trimer fatty triamine is a trimer of $C_{10}$ to $C_{30}$ alkyl chains.

10. A composition according to claim 7 wherein the higher oligomeric fatty amine is an oligomer comprising 4 or more units of $C_{10}$ to $C_{30}$ alkyl chains.

11. An epoxy resin cured with a curing agent, said curing agent comprising:
   (a) 5 to 35% by weight of higher oligomeric fatty amine that features one amine group per fatty acid repeating unit;
   (b) 15 to 55% by weight of trimer fatty triamine; and
   (c) 25 to 80% by weight of dimer fatty diamine;
   all based on the total weight of oligomeric, trimer, and dimer fatty amines present in the curing agent.

12. A method of curing an epoxy resin comprising mixing with the epoxy resin a curing agent comprising:
   (a) 15 to 55% by weight of a trimer fatty triamine;
   (b) 25 to 80% by weight of dimer fatty diamine; and
   (c) 5 to 35% by weight of a higher oligomeric fatty amine that features one amine group per fatty acid repeating unit,
   all based on the total weight of oligomer, trimer and dimer fatty amines present in the curing agent.

13. A method of curing the epoxy resin of claim 12, wherein the curing agent comprises in the range from 14 to 20% by weight of oligomeric fatty amines, 25 to 35% by weight of trimer fatty triamine and 50 to 60% by weight of dimer fatty diamine.

14. A method of making a coating composition comprising:
   (i) polymerising fatty acids under pressure to produce a reaction mixture comprising mono fatty acid and/or dimer fatty acid and/or trimer fatty acid,
   (ii) converting at least one of the acids in the reaction mixture produced in (i) to an amine, and
   (iii) mixing at least one of the amines produced in (ii) with an epoxy resin, with the proviso that said at least one of the amines comprises:
      (a) 5 to 35% by weight of higher oligomeric fatty amine that features one amine group per fatty acid repeating unit;

(b) 15 to 55% by weight of trimer fatty triamine; and
(c) 25 to 80% by weight of dimer fatty diamine;
all based on the total weight of oligomeric, trimer, and dimer fatty diamines present in the curing agent.

15. A method of making the coating composition of claim 14, wherein the oligomeric fatty amine is present in the range from 14 to 20% by weight and the trimer fatty triamine is present in the range from 25 to 35% by weight and the dimer fatty diamine is present in the range 50 to 60% by weight.

16. A coating composition comprising an epoxy resin and a curing agent comprising:
    (a) 14 to 20% by weight of tetramer fatty tetramines and higher oligomeric fatty amines, wherein the higher oligomeric fatty amines feature one amine group per fatty acid repeating unit,
    (b) 25 to 35% by weight of at least one trimer fatty triamine, and
    (c) 50 to 60% by weight of dimer fatty diamine,
    all based on the total weight of tetramer fatty tetramines and higher oligomeric fatty amines, trimer and dimer fatty amines present in the curing agent.

17. A composition according to claim 16 wherein the epoxy resin has an epoxy equivalent weight in the range from 160 to 4000 g.

18. A composition according to claim 16 wherein the trimer fatty triamine is a trimer of $C_{10}$ to $C_{30}$ alkyl chains.

19. A composition according to claim 16 wherein the tetramer fatty tetramines and higher oligomeric fatty amines are oligomers, comprising 4 or more units, of C10 to C30 alkyl chains.

20. An epoxy resin cured with a curing agent, said curing agent comprising:
    (a) 14 to 20% by weight of tetramer fatty tetramines and higher oligomeric fatty amines, wherein the higher oligomeric fatty amines feature one amine group per fatty acid repeating unit;
    (b) 25 to 35% by weight of at least one trimer fatty triamine; and
    (c) 50 to 60% by weight of dimer fatty diamine;
all based on the total weight of tetramer fatty tetramines and higher oligomeric fatty amines, trimer and dimer fatty amines present in the curing agent.

21. A coating composition comprising an epoxy resin and a curing agent comprising:
    (a) 15 to 55% by weight of at least one trimer fatty triamine;
    (b) 1 to 50% by weight of at least one higher oligomeric fatty amine featuring one amine group per fatty acid repeating unit; and
    (c) an optional dimer fatty diamine;
wherein said weight percentages are based on the total weight of dimer fatty diamine, trimer fatty triamine, and higher oligomeric fatty amine present in the curing agent.

22. A coating composition according to claim 21 wherein the curing agent comprises 5 to 35% by weight of higher oligomeric fatty amine.

23. A coating composition according to claim 21 wherein the curing agent comprises 20 to 45% by weight of trimer fatty amine.

24. A coating composition comprising an epoxy resin and a curing agent, said curing agent comprising: from 15 to 55% by weight of at least one trimer fatty triamine, an optional dimer fatty diamine, and a higher oligomeric fatty amine featuring one amine group per fatty acid repeating unit; wherein said weight percentages are based on the total weight of dimer fatty diamine, trimer fatty triamine, and higher oligomeric fatty amine present in the curing agent.

25. A coating composition according to claim 24 wherein the curing agent comprises 20 to 45% by weight of trimer fatty amine.

26. A coating composition according to claim 24 wherein the curing agent comprises 25 to 35% by weight of trimer fatty amine.

27. A coating composition according to claim 24 wherein the curing agent comprises 25 to 35% by weight of trimer fatty amine and 14 to 20% by weight of tetramer fatty tetramines and higher oligomeric fatty amines.

28. A concrete substrate coated with (i) a primer layer formed from a coating composition comprising an epoxy resin and a curing agent comprising at least one trimer fatty triamine and/or higher oligomeric fatty amine that features one amine group per fatty acid repeating unit, and (ii) an additional epoxy resin coating layer, different from the primer layer, optionally comprising filler.

29. A concrete substrate according to claim 28 wherein the curing agent comprises
    (a) (i) 30 to 70% by weight of trimer fatty triamine;
        (ii) 30 to 70% by weight of dimer fatty diamine; and
        (iii) less than 10% by weight of mono fatty monoamine,
        all based on the total weight of trimer, dimer and monomer fatty amines present in the curing agent; and/or
    (b) higher oligomeric fatty amine that features one amine group per fatty acid repeating unit.

30. A concrete substrate according to claim 28 wherein curing agent comprises:
    (a) 5 to 35% by weight of higher oligomeric fatty amine that features one amine group per fatty acid repeating unit;
    (b) 15 to 55% by weight of trimer fatty triamine; and
    (c) 25 to 80% by weight of dimer fatty diamine;
all based on the total weight of oligomeric, trimer, and dimer fatty amines present in the curing agent.

31. A concrete substrate according to claim 28 wherein curing agent comprises:
    (a) 14 to 20% by weight of tetramer fatty tetramines and higher oligomeric fatty amines that feature one amine group per fatty acid repeating unit;
    (b) 25 to 35% by weight of trimer fatty triamine; and
    (c) 50 to 60% by weight of dimer fatty diamine;
all based on the total weight of tetramer fatty tetramines and higher oligomeric fatty amines, trimer, and dimer fatty amines present in the curing agent.

32. A steel substrate coated with (i) a primer layer formed from a coating composition comprising an epoxy resin and a curing agent comprising at least one trimer fatty triamine and/or higher oligomeric fatty amine that features one amine group per fatty acid repeating unit, and (ii) an additional alkyd resin or polyurethane resin coating layer.

33. A steel substrate according to claim 32 wherein the curing agent comprises:
    (a) (i) 30 to 70% by weight of trimer fatty triamine;
        (ii) 30 to 70% by weight of dimer fatty diamine; and
        (iii) less than 10% by weight of mono fatty monoamine;
        all based on the total weight of trimer, dimer and monomer fatty amines present in the curing agent; and/or
    (b) higher oligomeric fatty amine that features one amine group per fatty acid repeating unit.

34. A steel substrate according to claim 32 wherein curing agent comprises:
    (a) 5 to 35% by weight of higher oligomeric fatty amine that features one amine group per fatty acid repeating unit;
    (b) 15 to 55% by weight of trimer fatty triamine; and
    (c) 25 to 80% by weight of dimer fatty diamine;

all based on the total weight of oligomeric, trimer, and dimer fatty amines present in the curing agent.

35. A steel substrate according to claim 32 wherein curing agent comprises:
(a) 14 to 20% by weight of tetramer fatty tetramines and higher oligomeric fatty amines that feature one amine group per fatty acid repeating unit;
(b) 25 to 35% by weight of trimer fatty triamine; and
(c) 50 to 60% by weight of dimer fatty diamine;

all based on the total weight of tetramer fatty tetramines and higher oligomeric fatty amines, trimer, and dimer fatty amines present in the curing agent.

* * * * *